US011245787B2

(12) United States Patent
Kim et al.

(10) Patent No.: US 11,245,787 B2
(45) Date of Patent: Feb. 8, 2022

(54) ACOUSTIC ECHO CANCELLING APPARATUS AND METHOD

(71) Applicant: SAMSUNG SDS CO., LTD., Seoul (KR)

(72) Inventors: Sang-Bum Kim, Seoul (KR); Sang-Bum Cho, Seoul (KR); Jun-Ho Kang, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 651 days.

(21) Appl. No.: 15/890,510

(22) Filed: Feb. 7, 2018

(65) Prior Publication Data

US 2018/0227414 A1 Aug. 9, 2018

(30) Foreign Application Priority Data

Feb. 7, 2017 (KR) .................. 10-2017-0016633

(51) Int. Cl.
*H04M 3/00* (2006.01)
*H04B 3/20* (2006.01)
*H04M 3/56* (2006.01)

(52) U.S. Cl.
CPC .............. *H04M 3/002* (2013.01); *H04B 3/20* (2013.01); *H04M 3/567* (2013.01); *H04M 3/568* (2013.01)

(58) Field of Classification Search
CPC ...... H04M 9/082; H04M 3/568; H04M 3/002; H04M 3/567; H04B 3/20
See application file for complete search history.

(56) References Cited

U.S. PATENT DOCUMENTS

| 8,290,142 | B1* | 10/2012 | Lambert | H04M 9/082 379/202.01 |
| 8,462,193 | B1* | 6/2013 | Truong | H04M 1/6016 348/14.08 |
| 10,283,121 | B1* | 5/2019 | List | H04R 1/326 |
| 2005/0262201 | A1* | 11/2005 | Rudolph | H04L 65/4038 709/205 |
| 2005/0271220 | A1* | 12/2005 | Bathurst | H04R 1/406 381/92 |
| 2008/0304653 | A1* | 12/2008 | Ghani | H04M 9/08 379/406.08 |
| 2010/0157015 | A1* | 6/2010 | Read | H04N 5/772 348/14.08 |
| 2010/0177667 | A1* | 7/2010 | Simmons | H04L 65/1053 370/260 |
| 2012/0243698 | A1* | 9/2012 | Elko | H04M 9/082 381/66 |
| 2012/0307980 | A1* | 12/2012 | Krishnaswany | H04M 9/082 379/3 |

(Continued)

*Primary Examiner* — Lisa Hashem
(74) *Attorney, Agent, or Firm* — Sughrue Mion, PLLC

(57) ABSTRACT

Disclosed are an acoustic echo cancelling apparatus and an acoustic echo cancelling method. The acoustic echo cancelling apparatus comprises a first capturer configured to capture a remote audio signal received from a remote machine; a second capturer configured to capture a local audio signal that is input to a local microphone; an acoustic echo canceller (AEC) configured to cancel an acoustic echo of the local audio signal using the remote audio signal and output a local audio signal from which the acoustic echo is cancelled; and a transmitter configured to transmit an output signal of the AEC to the remote machine.

10 Claims, 5 Drawing Sheets

(56) References Cited

U.S. PATENT DOCUMENTS

| | | | |
|---|---|---|---|
| 2013/0097244 A1* | 4/2013 | Manley | H04L 51/18 709/204 |
| 2014/0009564 A1* | 1/2014 | Cleve | H04M 3/002 348/14.08 |
| 2014/0148934 A1* | 5/2014 | Manley | H04M 3/42 700/94 |
| 2015/0050967 A1* | 2/2015 | Bao | H04R 3/005 455/570 |
| 2018/0227414 A1* | 8/2018 | Kim | H04M 3/002 |
| 2018/0358032 A1* | 12/2018 | Tanaka | G10L 21/0272 |
| 2019/0132452 A1* | 5/2019 | Liu | H04M 9/082 |
| 2019/0385629 A1* | 12/2019 | Moravy | H04L 7/0008 |

* cited by examiner

ACOUSTIC ECHO CANCELLING APPARATUS AND METHOD

CROSS-REFERENCE TO RELATED APPLICATION

This application claims the benefit under 35 USC § 119(a) of Korean Patent Application No. 10-2017-0016633, filed on Feb. 7, 2017, in the Korean Intellectual Property Office, the entire disclosure of which is incorporated herein by reference for all purposes.

BACKGROUND

1. Field

Embodiments of the present disclosure relate to a technique for cancelling an acoustic echo from audio data.

2. Discussion of Related Art

An acoustic echo is a phenomenon in which a speaker's voice is returned and heard again in a voice call or the like. The acoustic echo occurs when the speaker's voice output through a speaker is re-input through a microphone, and the acoustic echo is a major cause of degradation of voice quality in a voice call, a multi-party voice conference, and the like. As a result, most voice call solutions or voice conferencing solutions employ an acoustic echo canceller (AEC).

The AEC works well with small and constant delays on an echo path (a section during which a signal output from a speaker is input again into a microphone). In a typical environment in which a voice call solution or a multi-party voice conferencing solution is running in a local machine, the delay on the echo path is relatively small and constant, and thus cancellation of the acoustic echo is also relatively easy. However, when the voice call solution or the multi-party voice conferencing solution is running in a virtual machine in an environment in which a remote virtual machine and a local machine are connected through a network, there is fluctuation of a delay on the echo path due to a characteristic of the network and thus the fluctuation of the delay acts as a major cause of performance degradation of the AEC. Therefore, there is a need to effectively cancel an acoustic echo in an environment in which a remote virtual machine and a local machine are connected through a network.

SUMMARY

It is an objective of the disclosed embodiments to provide a technical means for effectively cancelling an acoustic echo in an environment in which a remote virtual machine and a local machine are connected through a network.

According to one aspect of the present disclosure, there is provided an acoustic echo cancelling apparatus comprising at least one processor configured to implement: a first capturer configured to capture a remote audio signal received from a remote machine; a second capturer configured to capture a local audio signal that is input to a local microphone; an acoustic echo canceller (AEC) configured to cancel an acoustic echo of the local audio signal using the remote audio signal and output a local audio signal from which the acoustic echo is cancelled as an output signal; and a transmitter configured to transmit the output signal to the remote machine.

The remote audio signal may be transmitted from a voice communication application running on the remote machine.

The transmitter may obtain the output signal through a virtual audio driver.

The virtual audio driver may comprise a virtual render driver configured to receive the output signal from the AEC; and a virtual capture driver configured to obtain the output signal from the virtual render driver and transmit the obtained output signal to the remote machine.

The virtual render driver may provide an interface for operating as a virtual speaker with respect to the AEC.

The virtual capture driver may provide an interface for operating as a virtual microphone with respect to the remote machine.

The virtual render driver may be further configured to write the output signal in a shared memory area which is shared with the virtual capture driver, and the virtual capture driver may be further configured to read a value written in the shared memory area to obtain the output signal.

The apparatus may further comprise, when a plurality of local microphones are present, a microphone selector configured to receive selection information on one of the plurality of local microphones from a user, wherein the second capturer may be further configured to capture a local audio signal input to the one of the plurality of local microphones selected by the microphone selector.

According to another aspect of the present disclosure, there is provided a voice communication apparatus including the above-described acoustic echo cancelling apparatus.

According to still another aspect of the present disclosure, there is provided an acoustic echo cancelling method, which is performed in a computing device having one or more processors and a memory configured to store one or more programs executed by the one or more processors, the method comprising capturing a remote audio signal received from a remote machine; capturing a local audio signal that is input to a local microphone; cancelling an acoustic echo of the local audio signal using the remote audio signal and outputting a local audio signal from which the acoustic echo is cancelled as an output signal; and transmitting the output signal to the remote machine.

The remote audio signal may be transmitted from a voice communication application running on the remote machine.

The transmitting may comprise obtaining the output signal through a virtual audio driver.

The transmitting may comprises writing by a virtual render driver the output signal in a shared memory area; reading by a virtual capture driver a value written in the shared memory area to obtain the output signal; and transmitting by the virtual capture driver the obtained output signal to the remote machine.

The method may further comprise, when a plurality of local microphones are present, before the capturing of the local audio signal, receiving selection information on one of the plurality of local microphones from a user, wherein the capturing of the local audio signal may capture a local audio signal input to the one of the plurality of local microphones selected in the receiving of the selection information.

wherein the voice communication application may be included in a virtual environment, and wherein the virtual environment may include a virtual client in the computing device.

wherein the virtual environment may further include a virtual server in the remote device.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION OF EXEMPLARY EMBODIMENTS

Hereinafter, specific embodiments of the present disclosure will be described with reference to the accompanying drawings. The following detailed description is provided to help a comprehensive understanding of methods, apparatuses, and/or systems described herein. However, these are merely illustrative embodiments, and the present disclosure is not limited thereto.

In the following description of embodiments of the present disclosure, if a detailed description of the known related art is determined to obscure the gist of the present disclosure, the detailed description thereof will be omitted. Further, all terms used hereinafter are defined by considering functions in the present disclosure, and meanings thereof may be different according to a user, the intent of an operator, or custom. Therefore, the definitions of the terms used herein should follow contexts disclosed herein. The terms used herein are used to describe the embodiments and are not intended to restrict and/or limit the present disclosure. Unless the context clearly indicates otherwise, the singular form includes the plural form. In this description, the terms "comprising," "having," or the like are used to specify that a feature, a number, a step, an operation, a component, an element, or a combination thereof described herein exists, and they do not preclude the presence or addition of one or more other features, numbers, steps, operations, components, elements, or combinations thereof.

Figure 1:
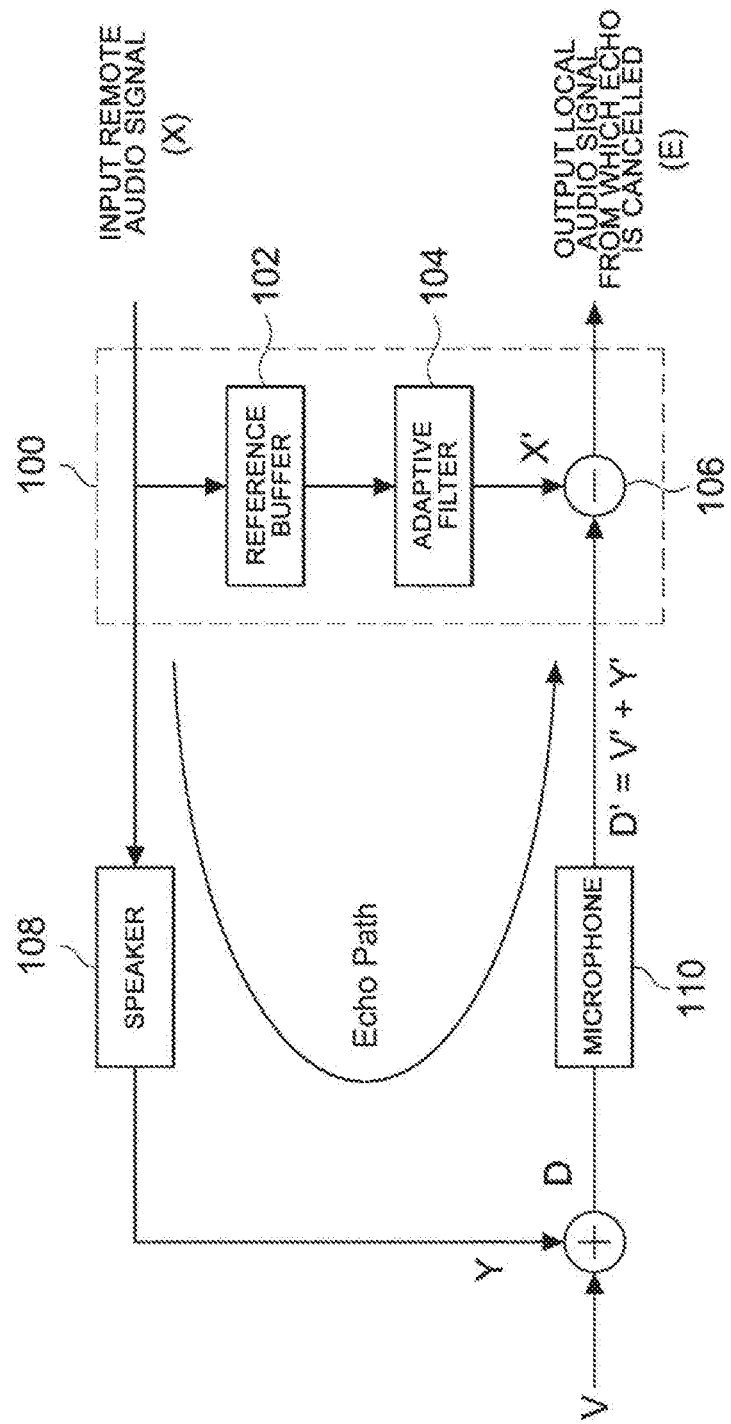
FIG. 1 is an exemplary diagram for describing an operation method of an acoustic echo canceller (AEC) used in a voice call system or a voice conference system.

FIG. 1 is an exemplary diagram for describing an operation method of an acoustic echo canceller (AEC) used in a voice communication system. In the embodiments of the present disclosure, the voice communication system is used to collectively refer to various types of audio-based communication systems based on networks such as a voice call, a multi-party voice conference, and the like. Further, the voice communication system is not limited to a communication system using only audio, but may also include a two-party video call, a multi-party video conference, and the like in which audio is included as a part of a communication means. That is, it is noted that the embodiments of the present disclosure are not limited to a communication system having a specific type or method.

In the embodiment shown in FIG. 1, an acoustic echo canceller 100 may be provided in a terminal which is used by a participant of a voice communication. According to the embodiment, the acoustic echo canceller 100 may be included as a component of a voice communication application in the terminal, or may operate in a form of an application or a process separate from the voice communication application. As shown in the drawing, the acoustic echo canceller 100 may include a reference buffer 102, an adaptive filter 104, and a subtractor 106.

The reference buffer 102 stores a remote audio signal X received from the other party of the voice communication. The remote audio signal X is transmitted to a speaker 108 of the terminal and output by the speaker 108. In this process, the remote audio signal X is modulated by an amplification process in the speaker 108 to become a signal Y, and is combined with a signal V denoting voice of the participant of the voice communication or background noise around the participant to become a signal D. The signal D is input to a microphone 110 provided at the terminal and amplified to become a signal D'.

Meanwhile, the remote audio signal X stored in the reference buffer 102 is converted into a signal X' by the adaptive filter 104. The signal X' is obtained by estimating a signal Y' which is obtained from the signal Y that is changed while passing through the microphone 110. Thereafter, the subtractor 106 cancels (subtracts) the signal X' from the signal D' such that only an echo-canceled signal E may be delivered to the other party.

In order to perform the acoustic echo cancelling process accurately, the acoustic echo canceller 100 should accurately obtain the signal X included in a current microphone input among signals stored in the reference buffer 102, and, to this end, it is important to accurately measure a delay on an echo path. For example, the echo path in the embodiment shown in FIG. 1 is as follows:

The acoustic echo canceller 100→The speaker 108→An acoustic environment→The microphone 110→The acoustic echo canceller 100.

Figure 2:
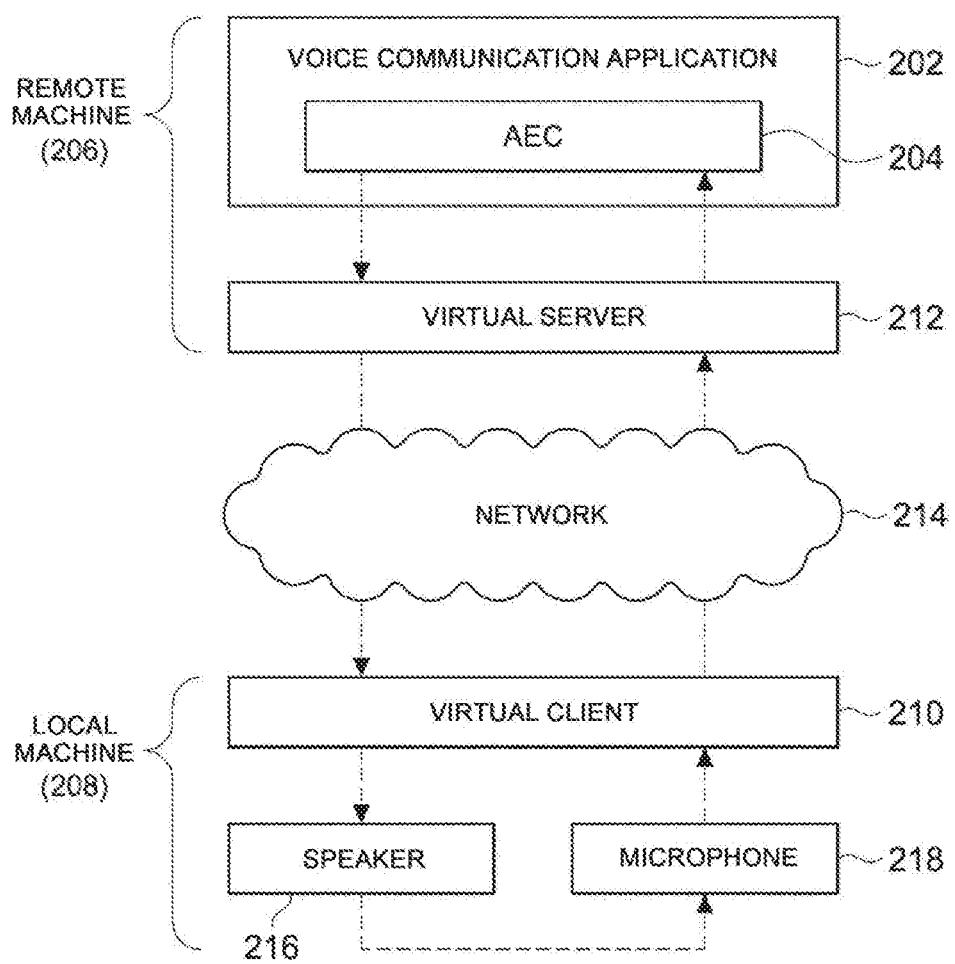
FIG. 2 is an exemplary diagram for describing a flow of audio data in a state in which a voice communication application is constructed in a remote virtual environment.

FIG. 2 is an exemplary diagram for describing a flow of audio data in a state in which a voice communication application is constructed in a remote virtual environment. In the embodiment shown in FIG. 2, a voice communication application 202 and an AEC 204 are installed on a virtual server 212 provided at a remote machine 206. In this case, the participant of the voice communication connects to the virtual server 212 through a virtual client 210 provided at a local machine 208 to operate the voice communication application 202. The virtual client 210 and the virtual server 212 are connected through a network 214. Further, to perform a voice communication, the participant uses a speaker 216 and a microphone 218 provided at the local machine 208. That is, when a voice communication application is installed in a remote virtual environment, the voice communication application 202 and the AEC 204 are located at the remote machine 206, and the speaker 216 and the microphone 218 for the voice communication are located at the local machine 208. The echo path (indicated by a dotted line) in such an environment is as follows:

The AEC 204→The virtual server 212→The network 214→The virtual client 210→The speaker 216→An acoustic environment (referring to a path in which an output of the speaker 216 is combined with an external audio signal and input to the microphone 218)→The microphone 218→The virtual client 210→The network 214→The virtual server 212→The AEC 204.

As can be seen from the above-described echo path, in the case of a virtual environment, a network delay which is relatively significantly varied and various delay elements (such as a virtual server, a virtual client, and the like) which are very difficult to measure are included in the echo path. Consequently, in the virtual environment, it is difficult for the AEC 204 to obtain an accurate signal (e.g., the echo signal X in the above-described example) for echo cancellation from a reference buffer such that performance degradation of the AEC 204 occurs.

Figure 3:
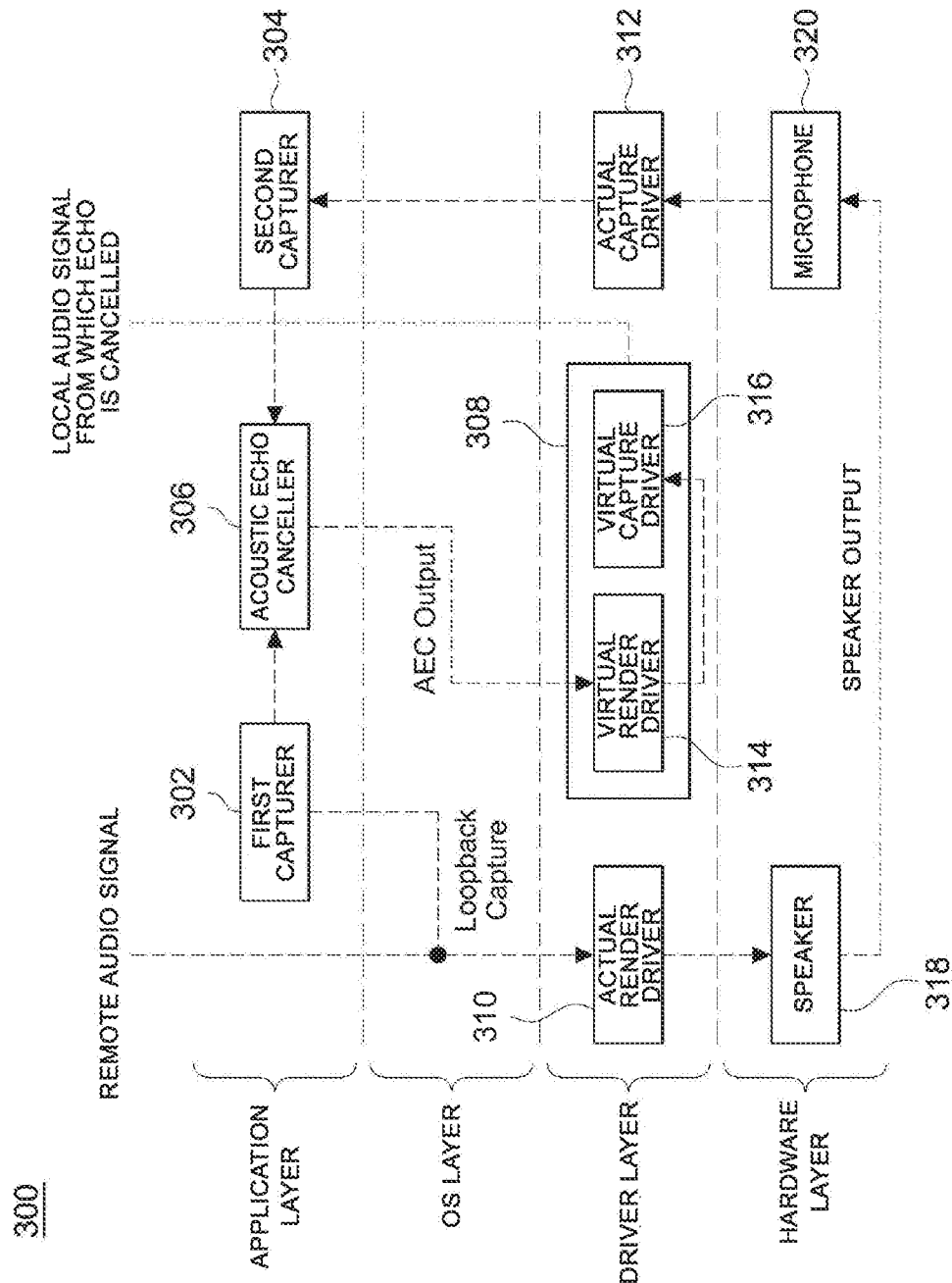
FIG. 3 is a block diagram for describing an acoustic echo cancelling apparatus according to one embodiment of the present disclosure.

FIG. 3 is a block diagram for describing an acoustic echo cancelling apparatus 300 according to one embodiment of the present disclosure. The acoustic echo cancelling apparatus 300 according to one embodiment of the present disclosure is an apparatus configured to receive a remote acoustic signal from a remote machine connected through a network and perform acoustic echo cancellation of a local audio signal input to a microphone using the remote audio signal. For example, the acoustic echo cancelling apparatus 300 may be provided inside the local machine 208 in the environment shown in FIG. 2. In this case, the acoustic echo cancelling apparatus 300 may be configured to receive the remote audio signal from the voice communication application 202 through the virtual server 212 and the virtual client 210, cancel an acoustic echo of the local audio signal input to the microphone 218 using the remote audio signal, and transmit the echo-canceled local audio signal to the voice communication application 202 via the virtual client 210 and the virtual server 212. Further, according to the embodiment, the acoustic echo cancelling apparatus 300 may be installed inside a voice communication apparatus as a component of the voice communication apparatus, or may be configured to be provided in separate hardware from the voice communication apparatus to transmit and receive data thereto and therefrom.

As shown in the drawing, the acoustic echo cancelling apparatus 300 according to one embodiment of the present disclosure includes a first capturer 302, a second capturer 304, an AEC 306, and a transmitter 308.

The first capturer 302 captures a remote audio signal which is received from a remote machine (not shown) and is transmitted a local speaker 318. At this point, the remote machine may be a machine that is controlled by a user the same as a user of the acoustic echo cancelling apparatus 300. For example, the user of the acoustic echo cancelling apparatus 300 may connect to the remote machine using the acoustic echo cancelling apparatus 300 and drive a voice communication application on the remote machine, thereby transmitting and receiving voice data to and from a communication party.

The voice communication application installed and operated on the remote machine transmits the remote audio signal to the acoustic echo cancelling apparatus 300. At this point, the remote audio signal may include one or more of audio data of the communication party and audio data generated at the remote machine. The acoustic echo cancelling apparatus 300, which has received the remote audio signal, outputs the remote audio signal to the local speaker 318 through an actual render driver 310 of a driver layer. The actual render driver 310 is a driver configured to drive the local speaker 318 which is a hardware device.

In one embodiment, the first capturer 302 may capture the remote audio signal using a loopback capture interface. Specifically, the first capturer 302 may be configured to obtain the remote audio signal by capturing the audio data input to the actual render driver 310 using the loopback capture interface which is an interface provided by an operating system. As described above, when the loopback capture interface is used, the remote audio signal may be easily obtained without changing other components such as a virtual client and the like.

The second capturer 304 captures the local audio signal input to a local microphone 320. At this point, the local audio signal includes voice of a speaker and also data (i.e., an acoustic echo) outputted from the local speaker 318. In one embodiment, the second capturer 304 may be configured to obtain the local audio signal from an actual capture driver 312 of the driver layer. The actual capture driver 312 is a driver configured to drive the local microphone 320 which is a hardware device.

The AEC 306 performs an acoustic echo cancellation algorithm using the remote audio signal obtained from the first capturer 302 and the local audio signal obtained from the second capturer 304, and as a result, generates an output signal (AEC Output). At this point, the output signal (AEC Output) refers to a signal in which an acoustic echo is cancelled from the local audio signal. Since the acoustic echo cancellation algorithm is well known to those skilled in the art, a description thereof will be omitted herein. For example, the AEC 306 may perform the acoustic echo cancellation of the local audio signal in the same or a similar manner as the algorithm described in FIG. 1.

The transmitter 308 transmits the output signal (AEC Output) of the AEC 306 to the remote machine. In one embodiment, the transmitter 308 may be configured to be located in the driver layer of the acoustic echo cancelling apparatus 300 in a form of a virtual audio driver. This will be described in more detail below.

As shown in FIG. 3, the transmitter 308 may be configured to include a virtual render driver 314 and a virtual capture driver 316.

First, the virtual render driver 314 may be configured to provide an interface for operating as a virtual speaker with respect to the AEC 306. In this case, the AEC 306 may transmit the output signal (AEC Output) to the virtual render driver 314 in a manner as outputting the output signal (AEC Output) through the virtual speaker.

Further, the virtual capture driver 316 may provide an interface for operating as a virtual microphone with respect to the remote machine, more specifically, with respect to the voice communication application provided at the remote machine. That is, the user of the remote voice communication application may recognize that the virtual microphone by the virtual capture driver 316 is present at the local machine in addition to the local microphone 320 which is a physical microphone, and may select the virtual microphone as a voice input means instead of the local microphone 320. Then, the virtual capture driver 316 may transmit the output signal (AEC Output) obtained by the virtual render driver 314 to the remote machine as a local voice signal.

Figure 4:
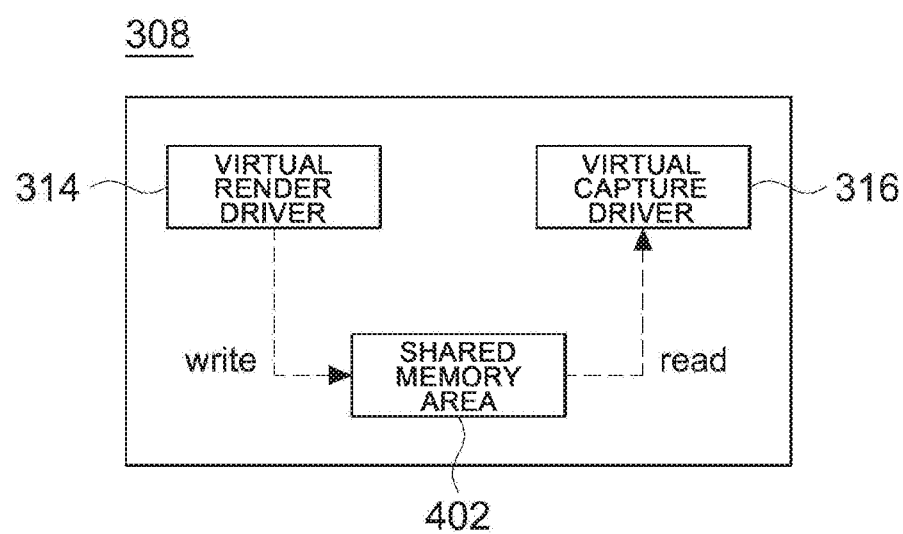
FIG. 4 is an exemplary diagram for describing a process of transmitting an output signal in a transmitter according to one embodiment of the present disclosure.

FIG. 4 is an exemplary diagram for describing a process of transmitting an output signal in the transmitter 308 according to one embodiment of the present disclosure. As described above, the transmission of the output signal (AEC Output) in the transmitter 308 is performed by the virtual capture driver 316. However, since the virtual capture driver 316 basically performs a virtual microphone function, there is no way to directly transmit the output signal (AEC Output) to the virtual capture driver 316 from the AEC 306. Therefore, a means for transmitting the output signal (AEC Output) from the virtual render driver 314 to the virtual capture driver 316 is needed.

In the embodiments of the present disclosure, a data transmission between the virtual render driver 314 and the virtual capture driver 316 is accomplished by a shared memory area 402. The shared memory area 402 is an area on a memory, which is set to be simultaneously accessed by the virtual render driver 314 and the virtual capture driver 316, and is configured to perform a function of a memory buffer. Specifically, when the output signal (AEC Output) is received from the AEC 306, the virtual render driver 314 writes the output signal (AEC Output) in the shared memory area 402. Then, when the local audio signal is requested from the remote machine, the virtual capture driver 316 reads data written in the shared memory area 402 and transmits the read data.

As described above, when the transmitter 308 is configured in a form of a virtual audio driver and the shared memory area 402 is provided to transmit data between the virtual render driver 314 and the virtual capture driver 316, the acoustic echo cancellation may be effectively performed in a state in which the voice communication application is constructed in the virtual environment without changing of the audio driver which has been installed, the virtual client, the virtual server, and the like.

Further, according to the embodiments of the present disclosure, the AEC 306 may be located inside the local machine instead of the remote machine such that delay elements (e.g., a network, a virtual client, a virtual server, and the like) may be prevented from being included on the echo path.

Meanwhile, the acoustic echo cancelling apparatus 300 according to one embodiment of the present disclosure may further include one or more of a speaker selector (not shown) and a microphone selector.

First, when a plurality of local speakers 318 are included in the acoustic echo cancelling apparatus 300, the speaker selector receives selection information on one among the plurality of local speakers 318 from the user, and sets the selected local speaker 318 as a default speaker device of the system.

Next, when a plurality of local microphones 320 are included in the acoustic echo cancelling apparatus 300, the microphone selector receives selection information on one among the plurality of local microphones 320 from the user. However, unlike the speaker selector, the microphone selector does not set the selected local microphone 320 as a default microphone device of the system, and always sets the virtual microphone by the virtual capture driver 316 of the transmitter 308 as the default microphone device. A default audio in the acoustic echo cancelling apparatus 300 is also applied to the voice communication application of the remote machine, and, when the selected local microphone is set as the default microphone device of the system, the local audio signal from which the acoustic echo is not cancelled is transmitted to the remote machine. Consequently, the microphone selector connects the selected local microphone 320 to the second capturer 304 instead of changing the default microphone device, thereby allowing the second capturer 304 to capture the local audio signal input to the selected local microphone 320 selected by the microphone selector.

The reason why the speaker selector and the microphone selector are separately provided in the acoustic echo cancelling apparatus 300 is that there is no channel that can directly communicate between the voice communication application of the remote machine and the AEC 306. In other words, since the voice communication application of the remote machine is present in the virtual environment and the AEC 306 is present in the local machine, it is practically impossible to provide a separate communication channel between the voice communication application and the AEC 306. Therefore, in the embodiment of the present disclosure, the separate speaker selector and the separate microphone selector are provided in the acoustic echo cancelling apparatus 300 such that it is possible to cope effectively even in a state in which a plurality of microphones or speakers are present.

In one embodiment, the acoustic echo cancelling apparatus 300 may be implemented on a computing device which includes one or more processors and a computer readable recording medium connected to the one or more processors. The computer readable recording medium may be present inside or outside the processor, and may be connected to the processor by a variety of well known means. The processor inside the computing device may control each computing device to operate according to the exemplary embodiments described herein. For example, it may be configured such that the processor may execute commands stored in the computer readable recording medium, and, when the commands stored in the computer readable recording medium are executed by the processor, the commands may control the computing device to perform operations according to the exemplary embodiments described herein.

Figure 5:
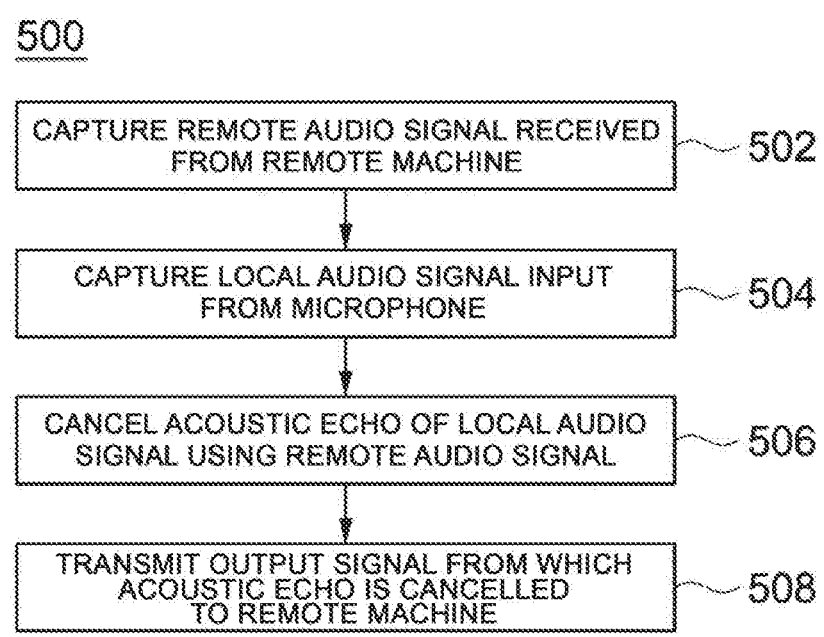
FIG. 5 is a flowchart for describing an acoustic echo cancelling method according to one embodiment of the present disclosure.

FIG. 5 is a flowchart for describing an acoustic echo cancelling method 500 according to one embodiment of the present disclosure. The method shown in FIG. 5 may be performed by a computing device having one or more processors and a memory configured to store one or more programs executed by the one or more processors, for example, the above-described acoustic echo cancelling apparatus 300. In the illustrated flowchart, the method is described as being divided into a plurality of operations, but at least some of the operations may be performed in a changed order, may be integrally performed by being combined with other operations, may be omitted, may be performed by being divided into sub-operations, or may be performed with one or more additional operations which are not illustrated.

In an operation 502, the first capturer 302 of the acoustic echo cancelling apparatus 300 captures the remote audio signal which is received from the remote machine connected via the network and is transmitted to the local speaker 318. At this point, the remote audio signal may be transmitted from the voice communication application running on the remote machine. Further, in one embodiment, the first capturer 302 may capture the remote audio signal using the loopback capture interface.

In an operation 504, the second capturer 304 of the acoustic echo cancelling apparatus 300 captures the local audio signal input to the local microphone 320.

In an operation 506, the AEC 306 of the acoustic echo cancelling apparatus 300 cancels an acoustic echo of the local audio signal using the captured remote audio signal, and outputs the echo-cancelled local audio signal (AEC Output).

In an operation 508, the transmitter 308 of the acoustic echo cancelling apparatus 300 transmits the output signal (AEC Output) of the AEC 306 to the remote machine. As described above, the transmitter 308 may include the virtual render driver 314 and the virtual capture driver 316. In this case, the virtual render driver 314 writes the output signal (AEC Output) in the shared memory area 402, and the virtual capture driver 316 reads a value written in the shared memory area 402 to obtain the output signal (AEC Output), and transmits the obtained output signal (AEC Output) to the remote machine.

Further, when a plurality of local microphones 320 are present, before the operation 504 is performed, receiving of selection information on one of the plurality of local microphones 320 from the user may be further included. In this case, the operation 504 may be configured to capture a local audio signal input to the local microphone 320 selected in the receiving of the selection information.

Meanwhile, the embodiment of the present disclosure may include a program for performing the methods described herein on a computer, and a computer readable recording medium including the program. The computer readable recording medium may include a program command, a local data file, a local data structure, or the like, or a combination thereof. The computer readable recording media may be those specially designed and constructed for the present disclosure, or may be those commonly used in the field of computer software. Examples of computer readable recording media include magnetic media such as hard disks, floppy disks, and magnetic tapes, optical recording media such as compact disc read only memories (CD-ROMs) and digital versatile discs (DVDs), and hardware devices specifically configured to store and execute program commands such as read only memories (ROMs), random access memories (RAMs), flash memories, and the like. Examples of such programs may include machine language codes such as those produced by a compiler, as well as high-level language codes that may be executed by a computer using an interpreter or the like.

In accordance with the disclosed embodiments, an acoustic echo can be effectively cancelled in an environment in which a remote virtual machine and a local machine are connected via a network. Further, in the environment in which the remote virtual machine and the local machine are connected via the network, an AEC can be effectively operated on the local machine without change of a virtual client, an audio driver, and the like which are installed at the local machine, or a virtual server and the like which are installed at a remote machine.

Although representative embodiments of the present disclosure have been described in detail, it should be understood that numerous modifications can be devised by those skilled in the art to which the present disclosure pertains without departing from the spirit and scope of the principles of this disclosure with respect to the described embodiments. Therefore, the scope of the present disclosure should not be limited to the described embodiments, and it should be determined by not only the appended claims but also equivalents to which such claims are entitled.

What is claimed is:

1. An acoustic echo cancelling apparatus, comprising:
    at least one processor configured to implement:
        a first capturer configured to capture a remote audio signal that is received from a remote machine and includes audio data of a party of a voice communication, and
        a second capturer configured to capture a local audio signal that is input to a local microphone;
    an acoustic echo canceller (AEC) configured to cancel an acoustic echo of the local audio signal using the remote audio signal and output a local audio signal from which the acoustic echo is cancelled as an output signal; and
    a transmitter configured to transmit the output signal to the remote machine,
    wherein the remote machine is a virtual machine connected to the acoustic echo cancelling apparatus through a network,
    wherein the remote machine is controlled by a user of the acoustic echo cancelling apparatus who is another party of the voice communication,
    wherein the transmitter obtains the output signal through a virtual audio driver, and
    wherein the virtual audio driver comprises:
        a virtual render driver configured to provide an interface for operating as a virtual speaker with respect to the AEC; and
        a virtual capture driver configured to provide an interface for operating as a virtual microphone with respect to the remote machine, wherein the virtual render driver is further configured to receive the output signal from the AEC, and the virtual capture driver is further configured to obtain the output signal from the virtual render driver and transmit the obtained output signal to the remote machine.

2. The acoustic echo cancelling apparatus of claim 1, wherein the remote audio signal is transmitted from a voice communication application running on the remote machine.

3. The acoustic echo cancelling apparatus of claim 1, wherein:
    the virtual render driver is further configured to write the output signal in a shared memory area which is shared with the virtual capture driver, and
    the virtual capture driver is further configured to read a value written in the shared memory area to obtain the output signal.

4. The acoustic echo cancelling apparatus of claim 1, further comprising, when a plurality of local microphones are present, a microphone selector configured to receive selection information on one of the plurality of local microphones from a user,
    wherein the second capturer is further configured to capture a local audio signal input to the one of the plurality of local microphones selected by the microphone selector.

5. A voice communication apparatus comprising the acoustic echo cancelling apparatus according to claim 1.

6. An acoustic echo cancelling method, which is performed in a computing device having one or more processors and a memory configured to store one or more programs executed by the one or more processors, the acoustic echo cancelling method comprising:
    capturing a remote audio signal that is received from a remote machine and includes audio data of a party of a voice communication;
    capturing a local audio signal that is input to a local microphone;
    cancelling, by an acoustic echo canceller (AEC), an acoustic echo of the remote audio signal using the remote audio signal;
    outputting, by the AEC, a local audio signal from which the acoustic echo is cancelled as an output signal; and
    transmitting the output signal to the remote machine,
    wherein the remote machine is a virtual machine connected to the computing device through a network,
    wherein the remote machine is controlled by a user of the computing device who is another party of the voice communication,
    wherein the transmitting comprises obtaining the output signal through a virtual audio driver, and
    wherein the virtual audio driver comprises:
    a virtual render driver configured to provide an interface for operating as a virtual speaker with respect to the AEC; and
    a virtual capture driver configured to provide an interface for operating as a virtual microphone with respect to the remote machine, wherein the transmitting comprises: writing by the virtual render driver the output signal in a shared memory area; reading by the virtual capture driver a value written in the shared memory area to obtain the output signal; and transmitting by the virtual capture river the obtained output signal to the remote machine.

7. The acoustic echo cancelling method of claim 6, wherein the remote audio signal is transmitted from a voice communication application running on the remote machine.

8. The acoustic echo cancelling method of claim 7, wherein the voice communication application is included in a virtual environment, and wherein the virtual environment includes a virtual client in the computing device.

9. The acoustic echo cancelling method of claim 8, wherein the virtual environment further includes a virtual server in the remote device.

10. The acoustic echo cancelling method of claim 6, further comprising, when a plurality of local microphones are present, before the capturing of the local audio signal, receiving selection information on one of the plurality of local microphones from a user, wherein the capturing of the local audio signal captures a local audio signal input to the one of the plurality of local microphones selected in the receiving of the selection information.

\* \* \* \* \*